United States Patent
Kobbekaduwa (10) Patent No.: US 11,693,757 B2
(45) Date of Patent: Jul. 4, 2023

(54) REQUIREMENT GATHERING IN PROCESS AUTOMATION

(71) Applicant: Virtusa Corporation, Southborough, MA (US)

(72) Inventor: Kaushalya Kobbekaduwa, Colombo (LK)

(73) Assignee: Virtusa Corporation, Southborough, MA (US)

( * ) Notice: Subject to any disclaimer, the term of this patent is extended or adjusted under 35 U.S.C. 154(b) by 159 days.

(21) Appl. No.: 16/748,954

(22) Filed: Jan. 22, 2020

(65) Prior Publication Data
US 2020/0249991 A1 Aug. 6, 2020

Related U.S. Application Data

(60) Provisional application No. 62/799,811, filed on Feb. 1, 2019.

(51) Int. Cl.
| | |
|---|---|
| *G06F 11/34* | (2006.01) |
| *G06Q 10/06* | (2023.01) |
| *G06F 9/445* | (2018.01) |
| *G06F 9/50* | (2006.01) |

(52) U.S. Cl.
CPC .......... *G06F 11/3438* (2013.01); *G06F 11/34* (2013.01); *G06F 9/445* (2013.01); *G06F 9/50* (2013.01); *G06Q 10/06* (2013.01)

(58) Field of Classification Search
None
See application file for complete search history.

(56) References Cited

U.S. PATENT DOCUMENTS

2017/0001308 A1* 1/2017 Bataller ............. G05B 19/0423

OTHER PUBLICATIONS

Choudhary et al., "WEBDIFF: Automated Identification of Cross-browser Issues in Web Applications", 2010, IEEE International Conference on Software Maintenance in Timoroara Romania (Year: 2010).*
Feng et al., "Multi-objective Test Report Prioritization using Image Understanding", Sep. 2016, ACM (Year: 2016).*
Selay et al., "Adaptive Random Testing for Image Comparison in Regression Web Testing", 2014, IEEE (Year: 2017).*

* cited by examiner

*Primary Examiner* — Qing Yuan Wu
(74) *Attorney, Agent, or Firm* — Danielson Legal LLC (57) ABSTRACT

A system and a method for requirement gathering in process automation is disclosed. The method includes capturing one or more application screens along with one or more actions performed by a user on the one or more corresponding application screens; extracting one or more features from one or more captured application screens; determining a level of similarity between one or more extracted features of the corresponding one or more application screens and one or more prestored features of corresponding one or more prestored application screens; creating clusters of the one or more actions performed by the user based on a determined level of similarity; creating one or more nodes of the at least one application screens based on clustering of the one or more actions; generating a specification template for process automation based on the one or more nodes of the at least one application screens.

6 Claims, 5 Drawing Sheets

REQUIREMENT GATHERING IN PROCESS AUTOMATION

CROSS-REFERENCE TO RELATED APPLICATIONS

The present application claims the benefit of and priority to U.S. provisional application No. 62/799,811, filed on Feb. 1, 2019, the entire disclosure of which is hereby incorporated by reference as if set forth in its entirety herein.

BACKGROUND

Embodiments of a present disclosure relates to a process automation, and more particularly to a system and a method for requirement gathering in process automation.

Process automation refers to the use of digital technology to perform a process or processes in order to accomplish a workflow or function. Process automation is required to improve operations of organizations by identifying repetitive and redundant manual tasks, and then digitize them to achieve efficiency and a higher profit margin.

Conventionally, various techniques such as interviews, surveys, brainstorming, interface analysis and the like are used to learn about the processes. However, such techniques are error prone and results in producing inaccurate results. Also, such techniques may fail to recognize or make note of all the possible scenarios of a process which may lead to failure in handling any kind of exceptions. Further, as the complexities in each process tend to vary, therefore "requirement gathering" phase becomes tedious and time consuming.

Hence, there is a need for an improved system and method for requirement gathering in process automation in order to address the aforementioned issues.

BRIEF DESCRIPTION

In accordance with one embodiment of the disclosure, a method for requirement gathering in process automation is provided. The method includes capturing one or more application screens along with one or more actions performed by a user on the one or more corresponding application screens. The method also includes extracting one or more features from one or more captured application screens by using an extraction technique. The method also includes determining a level of similarity between one or more extracted features of the corresponding one or more application screens and one or more prestored features of corresponding one or more prestored application screens. The method also includes creating clusters of the one or more actions performed by the user based on a determined level of similarity for assigning the one or more actions to the corresponding one or more application screens. The method also includes creating one or more nodes of the at least one application screens based on clustering of the one or more actions, wherein the one or more nodes are representative of one or more requirements to be gathered. The method also includes generating a specification template for process automation based on the one or more nodes of the at least one application screens, wherein the specification template comprises a process hierarchy.

In accordance with another embodiment of the disclosure, a system for requirement gathering in process automation is provided. The system includes one or more processors. The system also includes a data capturing subsystem operable by the one or more processors. The data capturing subsystem is configured to capture one or more application screens along with one or more actions performed by a user on the one or more corresponding application screens. The system also includes a feature extraction subsystem operable by the one or more processors. The feature extraction subsystem is configured to extract one or more features from one or more captured application screens by using an extraction technique. The system also includes a level determination subsystem operable by the one or more processors. The level determination subsystem is configured to determine a level of similarity between one or more extracted features of the corresponding one or more application screens and one or more prestored features of corresponding one or more prestored application screens. The system also includes a cluster creation subsystem operable by the one or more processors. The cluster creation subsystem is configured to create clusters of the one or more actions performed by the user based on a determined level of similarity for assigning the one or more actions to the corresponding one or more application screens. The system also includes a node creation subsystem operable by the one or more processors. The node creation subsystem is configured to create one or more nodes of the at least one application screens based on clustering of the one or more actions, wherein the one or more nodes are representative of one or more requirements to be gathered. The system also includes a template generation subsystem operable by the one or more processors. The template generation subsystem is configured to generate a specification template for process automation based on the one or more nodes of the at least one application screens, wherein the specification template comprises a process hierarchy.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for requirement gathering in process automation. The method includes capturing one or more application screens along with one or more actions performed by a user on the one or more corresponding application screens. The method also includes extracting one or more features from one or more captured application screens by using an extraction technique. The method also includes determining a level of similarity between one or more extracted features of the corresponding one or more application screens and one or more prestored features of corresponding one or more prestored application screens. The method also includes creating clusters of the one or more actions performed by the user based on a determined level of similarity for assigning the one or more actions to the corresponding one or more application screens. The method also includes creating one or more nodes of the at least one application screens based on clustering of the one or more actions, wherein the one or more nodes are representative of one or more requirements to be gathered. The method also includes generating a specification template for process automation based on the one or more nodes of the at least one application screens, wherein the specification template comprises a process hierarchy.

Figure 1:
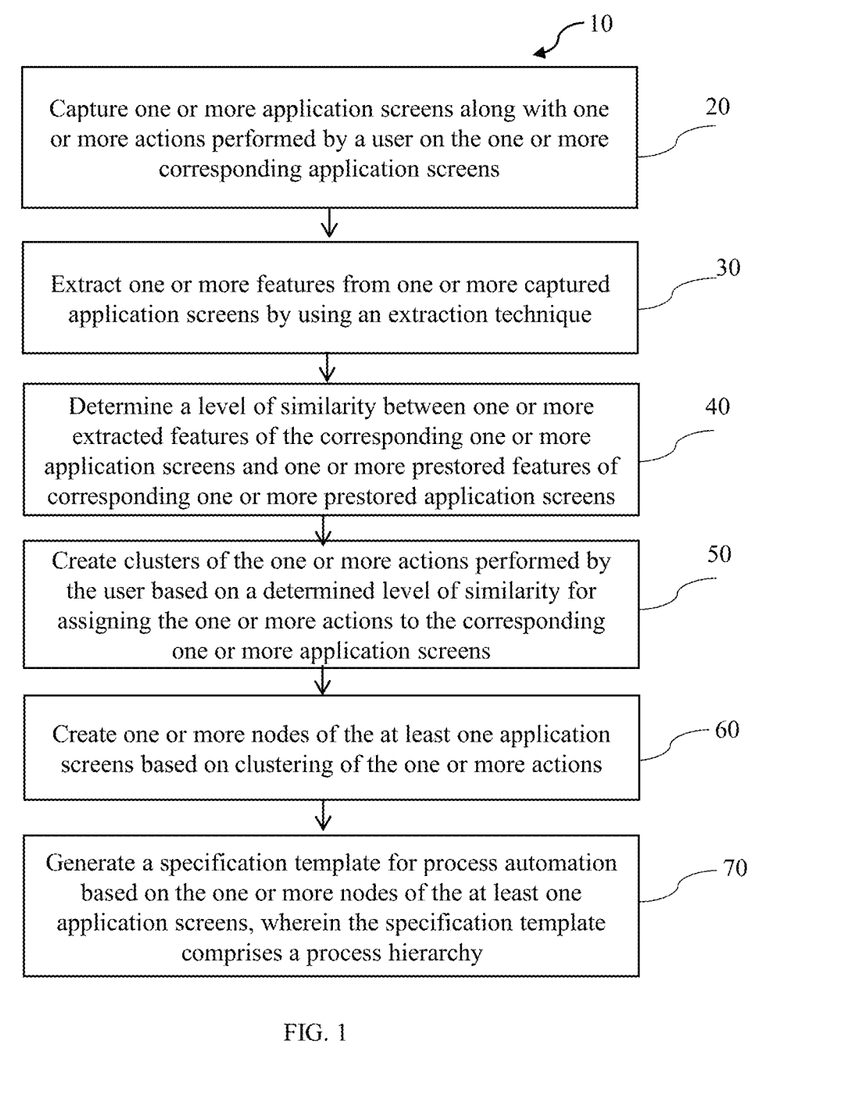
FIG. 1 is a flow diagram representing steps involved in a method for requirement gathering in process automation in accordance with an embodiment of the present disclosure.

FIG. 1 is a flow diagram representing steps involved in a method 10 for requirement gathering in process automation in accordance with an embodiment of the present disclosure. The method 10 includes capturing, by a data capturing subsystem, one or more application screens along with one or more actions performed by a user on the one or more corresponding application screens in step 20. In one embodiment, capturing of the one or more application screens along with the one or more actions may be performed by at least one entity. In such embodiment, capturing of the one or more application screens along with the one or more actions performed by at least one entity may include capturing of the one or more application screens along with the one or more actions performed by a bot installed within a user's machine. As used herein, the term "bot" is a software application programmed to perform certain tasks.

Further, in some embodiment, capturing the one or more user actions may include capturing one of keyboard events, left click, right click, opening of windows, execution of system commands, clicks on checkboxes, text entered, text edited or a combination thereof. Furthermore, in some embodiment, the method 10 may include indicating, by at least one entity, an exact location of the one or more actions performed by the user on the one or more corresponding application screens.

The method 10 may also include communicating, by the at least one entity, with a server using an application programming interface (API) to send one or more captured application screens along with one or more captured actions to the server. Furthermore, the method 10 also includes extracting, by a feature extraction subsystem, one or more features from the one or more captured application screens by using an extraction technique in step 30. In one embodiment, extracting the one or more features from the one or more captured application screens by using the extraction technique may include extracting window titles, image features or key points, color histograms, application screen text or a combination thereof from the one or more captured application screens.

In one exemplary embodiment, extracting the one or more features may include extracting window titles associated with the one or more corresponding application screens using Java Native Access (JNA) library. As used herein, the term "Java Native Access" refers to a library that provides Java programs easy access to native shared libraries without using the Java Native Interface. In some embodiment, extracting the one or more features may include extracting one or more images features from the one or more captured application screens by using an OpenCV library. As used herein, the term "OpenCV library" refers to a library of Python bindings designed to solve computer vision problems.

Similarly, in one specific embodiment, extracting the one or more features may include extracting text from the one or more application screens using an optical character recognition (OCR) technique. As used herein, the term "optical character recognition technique" refers to an electronic or mechanical conversion of images of typed, handwritten or printed text into machine-encoded text, whether from a scanned document, a photo of a document, a scene-photo or from subtitle text superimposed on an image. In some embodiment, extracting the one or more features may include extracting color histograms from the one or more captured application screens.

Further, the method 10 also includes determining, by a level determination subsystem, a level of similarity between the one or more extracted features of the corresponding one or more application screens and one or more prestored features of corresponding one or more prestored application screens in step 40. In one embodiment, the method 10 may include defining, by the level determination subsystem, threshold values for the one or more extracted features of the corresponding one or more application screens upon receiving instruction from the user for determining the level of similarity between the one or more extracted features of the corresponding one or more application screens and the one or more prestored features of corresponding one or more prestored application screens.

The method 10 may include fetching the one or more prestored features of the corresponding one or more prestored application screens from a database, wherein the database may also include the user associated to the corresponding application screen, a timestamp and the like.

In some embodiment, the method 10 may include comparing one or more extracted features with one or more prestored features of the one or more corresponding prestored application screens based on a predefined threshold value of the one or more features of the corresponding one or more application screens. Further, in some embodiment, the method 10 may include comparing each of the one or more extracted features with the each of the one or more prestored features until a nearest match is found. In one embodiment, the method 10 may include obtaining result of the comparison in a score which depends on whether it exceeds the predefined threshold value.

Further, in one embodiment, the method 10 may include indicating, by the level determination subsystem, the one or more captured application screens as similar (an instance of the existing application screens) when the score of the one or more extracted features exceeds the threshold value, which in further represents there is a match. In another embodiment, the method 10 may include indicating, by the level determination subsystem, the one or more captured application screens as a unique when the score of the one or more extracted features is less than the threshold value.

Further, the method 10 may include comparing one or more extracted image features with one or more prestored image features of the one or more corresponding prestored application screens for calculating a score associated with the image features based on a predefined threshold value of the one or more image features of the corresponding one or more application screens using an orient fast and rotated brief (ORB). As used herein, the term "orient fast and rotated brief" refers to a fast-robust local feature detector that can be used in computer vision tasks like object recognition or 3D reconstruction.

In some embodiment, the method 10 may include comparing extracted color histograms with one or more prestored color histograms of the one or more corresponding prestored application screens for calculating a score associated with the color histograms based on a predefined threshold value of the one or more color histograms of the corresponding one or more application screens using OpenCV histogram comparison technique upon matching the one or more extracting image features, wherein the OpenCV histogram comparison technique compares two histograms such as H1 and H2 by selecting a metric (d(H1, H2)) to indicate how well both histograms will match. Further, OpenCV computes function cv::compareHist to perform a comparison.

In one specific embodiment, the method 10 may include comparing extracted window titles with one or more prestored window titles of the one or more corresponding prestored application screens for calculating a score associated with the window titles based on a predefined threshold value of the one or more window titles of the corresponding one or more application screens using Levenshtein distance technique upon matching the extracted color histograms. As used herein, the term "The Levenshtein distance" refers to a string metric for measuring the difference between two sequences.

Further, in some embodiment, the method 10 may also include comparing one or more extracted screen texts with one or more prestored screen texts of the one or more corresponding prestored application screens for calculating a score associated with the screen texts based on a predefined threshold value of the one or more screen texts of the corresponding one or more application screens using Levenshtein distance technique upon matching the extracted window titles.

The method 10 also includes creating, by a cluster creation subsystem, clusters of the one or more actions performed by the user based on a determined level of similarity for assigning the one or more actions to the corresponding one or more application screens in step 50.

The method 10 also includes creating, by a node creation subsystem, one or more nodes for each of the plurality of application screens along with the one or more actions based on clustering of the one or more actions in step 60. In one embodiment, the one or more nodes are representative of one or more requirements to be gathered. Further, in some embodiment, the method 10 may include creating a group of one or more created nodes for creating one or more subprocesses upon receiving instructions from the user. In one embodiment, the method 10 may also include creating a group of one or more subprocesses for further creating one or more processes upon receiving instructions from the user.

The method 10 may also include creating a group of the one or more processes associated with a department to further obtain an organization process hierarchy. The method 10 also includes generating, by a template generation subsystem, a specification template for process automation based on the one or more nodes of the at least one application screens in step 70. The specification template comprises a process hierarchy. In an embodiment, the generated template includes a complete view of one or more actions required to implement a particular process. In an exemplary embodiment where the information gathered was with respect to word processing, the method 10 may include populating automatically the word processing template for including screen flow diagrams along with the one or more actions.

Figure 2:
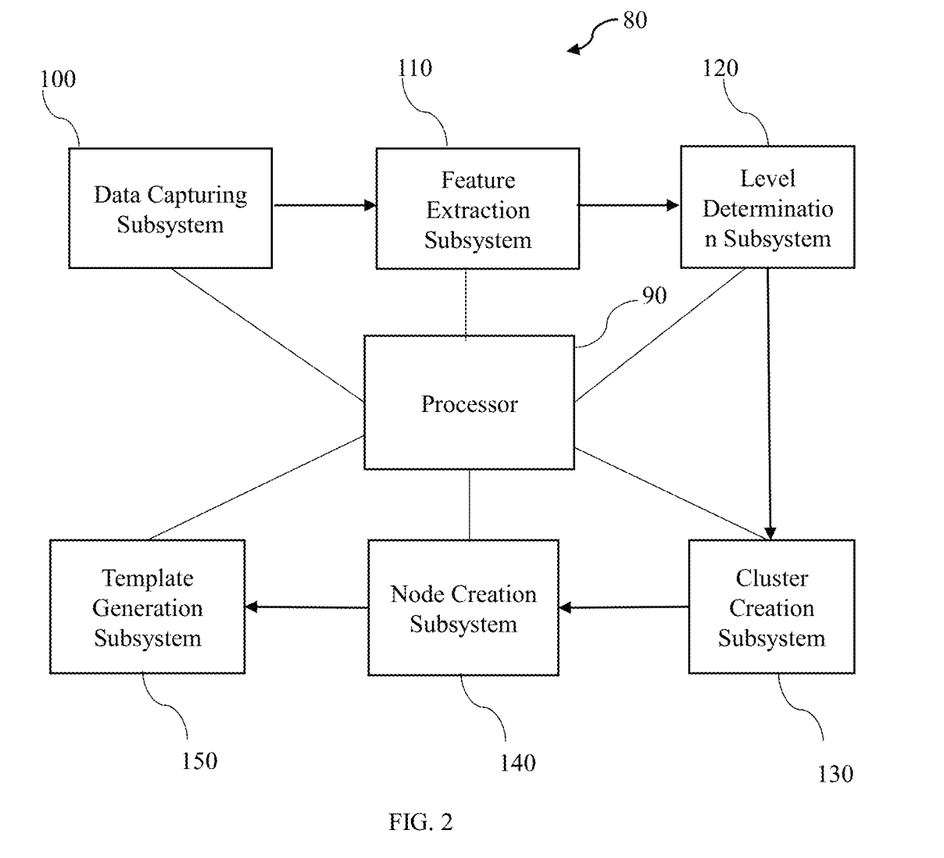
FIG. 2 is a block diagram representation of a system for requirement gathering in process automation in accordance with an embodiment of the present disclosure.

FIG. 2 is a block diagram representation of a system 80 for requirement gathering in process automation in accordance with an embodiment of the present disclosure. The system 80 includes one or more processors 90. The system 80 also includes a data capturing subsystem 100 operable by the one or more processors 90. The data capturing subsystem 100 is configured to capture one or more application screens along with one or more actions performed by a user on the one or more corresponding application screens. In one embodiment, the one or more application screens along with the one or more actions may be captured by at least one entity. In such embodiment, the at least one entity may include a bot installed within a user's machine.

Further, in some embodiment, the one or more actions may include keyboard events, left click, right click, opening of windows, execution of system commands, clicks on checkboxes, text entered, text edited or a combination thereof. In one embodiment, the at least one entity may be configured to indicate an exact location of the one or more actions performed by the user on the one or more corresponding application screens.

Further, the at least one entity associated with the user's machine may be configured to communicate with a server using an application programming interface (API) to send one or more captured application screens along with one or more captured actions to the server. Furthermore, the system 80 also includes a feature extraction subsystem 110 operable by the one or more processors 90. The feature extraction subsystem 110 is operatively coupled to the data capturing subsystem 100. The feature extraction subsystem 110 is configured to extract one or more features from the one or more captured application screens by using an extraction technique. In one embodiment, the one or more features may include, but not limited to, window titles, image features or key points, color histograms, application screen text or a combination thereof.

In one specific embodiment, the feature extraction subsystem 110 may be configured to extract window titles associated with the one or more corresponding application screens using Java Native Access (JNA) library. Further, in one embodiment, the feature extraction subsystem 110 may be configured to extract one or more images features from the one or more captured application screens by using an OpenCV library. As used herein, the term "OpenCV library" refers to a library of Python bindings designed to solve computer vision problems.

Similarly, in one specific embodiment, the feature extraction subsystem 110 may be configured to extract text from the one or more application screens using an optical character recognition (OCR) technique. As used herein, the term "optical character recognition technique" refers to an electronic or mechanical conversion of images of typed, handwritten or printed text into machine-encoded text, whether from a scanned document, a photo of a document, a scene-photo or from subtitle text superimposed on an image. Further, the feature extraction subsystem 110 may also be configured to extract color histograms from the one or more captured application screens.

Furthermore, the system 80 also includes a level determination subsystem 120 operable by the one or more processors 90. The level determination subsystem 120 is operatively coupled to the feature extraction subsystem 110. The level determination subsystem 120 is also configured to determine a level of similarity between the one or more extracted features of the corresponding one or more application screens and one or more prestored features of corresponding one or more prestored application screens. Further, in some embodiment, the level determination subsystem 120 may be configured to define threshold values for the one or more extracted features of the corresponding one or more application screens upon receiving instruction from the user for determining the level of similarity between the one or more extracted features of the corresponding one or more application screens and the one or more prestored features of corresponding one or more prestored application screens.

In some embodiment, the one or more prestored features of the corresponding one or more prestored application screens may be fetched from a database, wherein the database may also include the user associated to the corresponding application screen, a timestamp and the like.

Further, in order to determine the level of similarity, one or more extracted features may be compared with one or more prestored features of the one or more corresponding prestored application screens based on a predefined threshold value of the one or more features of the corresponding one or more application screens.

In some embodiment, the comparison of each of the one or more extracted features with the each of the one or more prestored features may be performed until a nearest match is found. In such embodiment, the comparison of each of the one or more extracted features with the each of the one or more prestored features may result in a score which depends on whether it exceeds the predefined threshold value or not.

Further, in one embodiment, the level determination subsystem 120 may be configured to indicate the one or more captured application screens as similar (an instance of the existing application screens) when the score of the one or more extracted features exceeds the threshold value, which in further represents a match. In another embodiment, the level determination subsystem 120 may be configured to indicate the one or more captured application screens as a unique when the score of the one or more extracted features is less than the threshold value.

Initially, one or more extracted image features may be compared with one or more prestored image features of the one or more corresponding prestored application screens for calculating a score associated with the image features based on a predefined threshold value of the one or more image features of the corresponding one or more application screens using an orient fast and rotated brief (ORB). As used herein, the term "orient fast and rotated brief" refers to a fast-robust local feature detector that can be used in computer vision tasks like object recognition or 3D reconstruction.

Further, extracted color histograms may be compared with one or more prestored color histograms of the one or more corresponding prestored application screens for calculating a score associated with the color histograms based on a predefined threshold value of the one or more color histograms of the corresponding one or more application screens using OpenCV histogram comparison technique upon matching the one or more extracting image features, wherein the OpenCV histogram comparison technique compares two histograms such as H1 and H2 by selecting a metric (d(H1,H2)) to indicate how well both histograms will match.

Further, OpenCV computes function cv::compareHist to perform a comparison. Further, extracted window titles may be compared with one or more prestored window titles of the one or more corresponding prestored application screens for calculating a score associated with the window titles based on a predefined threshold value of the one or more window titles of the corresponding one or more application screens using a Levenshtein distance technique upon matching the extracted color histograms.

Further, in one embodiment, one or more extracted screen texts may be compared with one or more prestored screen texts of the one or more corresponding prestored application screens for calculating a score associated with the screen texts based on a predefined threshold value of the one or more screen texts of the corresponding one or more application screens using the Levenshtein distance technique upon matching the extracted window titles.

In some embodiment, the level determination subsystem 120 may be configured to produce result based on the scores associated with the one or more extracted features. In such embodiment, the result may include one of a definite match, a probable match or no match.

Further, the system 80 also includes a cluster creation subsystem 130 operable by the one or more processors 90. The cluster creation subsystem 130 is operatively coupled to the level determination subsystem 120. The cluster creation subsystem 130 is configured to create clusters of the one or more actions performed by the user based on a determined level of similarity for assigning the one or more actions to the corresponding one or more application screens.

Furthermore, the system 80 also includes a node creation subsystem 140 operable by the one or more processors 90. The node creation subsystem 140 is operatively coupled to the cluster creation subsystem 130. The node creation subsystem 140 is configured to create one or more nodes for each of the plurality of application screens along with the one or more actions based on clustering of the one or more actions. In one embodiment, the one or more nodes are representative of one or more requirements to be gathered. Further, in some embodiment, the node creation subsystem 140 may be configured to create a group of one or more created nodes for creating one or more subprocesses upon receiving instructions from the user.

Furthermore, the node creation subsystem 140 may be configured to create a group of one or more subprocesses for further creating one or more processes upon receiving instructions from the user. Afterwards, the node creation subsystem 140 may also be configured to create a group of the one or more processes associated with each department to further obtain an organization process hierarchy.

Further, the system 80 also includes a template generation subsystem 150 operable by the one or more processors 90. The template generation subsystem 150 is operatively coupled to the node creation subsystem 140. The template generation subsystem 150 is configured to generate a specification template for process automation based on the one or more nodes of the at least one application screens, wherein the specification template comprises a process hierarchy. In one embodiment, the template generation subsystem 150 may be configured to automatically populate a word processing template for including screen flow diagrams along with the one or more actions. In one specific embodiment, generated template may include a complete view of one or more actions required to implement a particular process.

Figure 3:
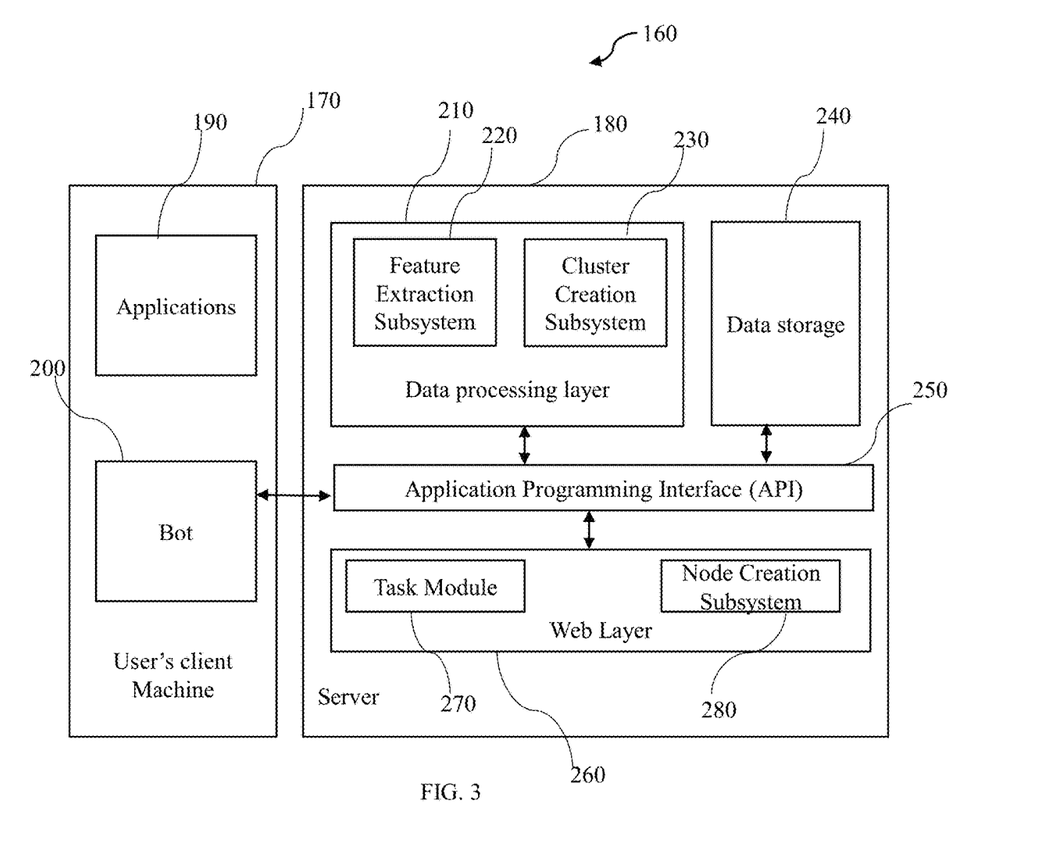
FIG. 3 illustrates a system for requirement gathering of FIG. 2 in accordance with an embodiment of the present disclosure.

FIG. 3 illustrates a system 160 for requirement gathering in accordance with an embodiment of the present disclosure. The system 160 includes one or more client machines 170 and a server 180. The client machines 170 includes one or more applications 190 and bots 200, wherein the client machines 170 may execute the one or more applications 190 and the bots 200 may be configured to monitor the one or more actions performed by the user via the corresponding one or more applications 190.

Further, the server 180 may be configured to receive data from the bots 200 associated with each client machine 170 to identify unique nodes and screens accordingly. Furthermore, the server 180 may include a data processing layer 210, wherein the data processing layer 210 includes a feature extraction subsystem 220 and a cluster creation subsystem 230. The feature extraction subsystem 220 is configured to extract one or more features from the one or more monitored application screens, wherein the one or more features may include, but not limited to, window titles, image features, color histograms, application screen text and the like.

Further, the cluster creation subsystem 230 may be configured to analyse the one or more extracted features to determine whether the application is unique or a variant of previously captured application screen. Furthermore, the server 180 includes a data storage 240 configured to store data associated with the previously captured application screens and corresponding one or more actions. Further, the server 180 also includes a web or presentation layer 260. The API 250 such as Representational State Transfer API may be used to communicate or data transfer between the web layer 260, the data storage 240 and the data processing layer 210.

In one embodiment, the bots 200 may also communicate with the server 180 via the API 250. The web layer 260 may serve as a user interface for the user. The web layer 260 may include a task module 270 and a node creation subsystem 280. The task module 270 may be configured to enable the user to view and edit details of each application screen and its content. The node creation subsystem 280 may be configured to group each of the application screens to create sub-processes and further group subprocesses to create process flows and the like.

Furthermore, the feature extraction subsystem (220), the cluster creation subsystem (230) and the node creation subsystem (280) are substantially similar to a feature extraction subsystem (110), a cluster creation subsystem (130) and a node creation subsystem (140) of FIG. 2.

Figure 4:
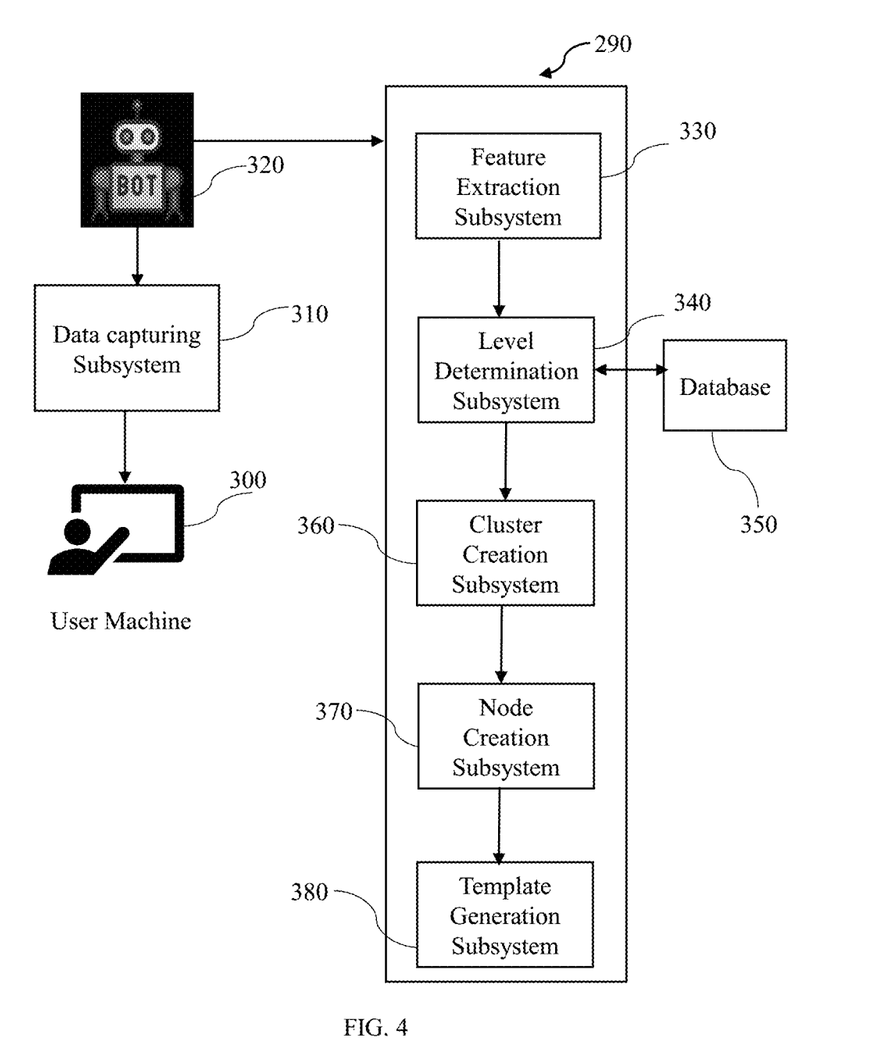
FIG. 4 is a block diagram of an exemplary embodiment of the system for requirement gathering in process automation of FIG. 2 in accordance with an embodiment of the present disclosure.

FIG. 4 is a block diagram of an exemplary embodiment of the system 290 for requirement gathering in process automation of FIG. 2 in accordance with an embodiment of the present disclosure. Suppose a user opens an 'X' application by entering a username and a password and then click on a login button at a user's machine 300. Each input of the user such as keyword input, left click, right click and the like is captured, by a data capturing subsystem 310, by a bot 320 residing within the user's machine 300. Also, each screen of the application is captured, by the data capturing subsystem 310, by the bot 320. Further, a plurality of features such as window titles, image features, color histograms, screen text from each screen of the application is extracted, by a feature extraction subsystem 330.

Afterwards, a similarity level is determined, by a level determination subsystem 340, by comparing each of the plurality of features with a predefined threshold value of corresponding feature from a database 350, wherein the similarity may be represented by a score. If the score exceeds the threshold value, then there is a match. If the score does not exceed the threshold value, then there is no match. Initially, the image features are compared with the threshold value of the corresponding image features, if there is a match based on image features, then scores are calculated to identify match based on color histograms, window titles and the like.

Further, based on the calculated scores, matching may be indicated as definite match, probable match or no match. Further, clustering of the one or more actions may be performed by a cluster creation subsystem 360, based on the similarity for assigning the one or more actions to the corresponding one or more application screens. Further, upon clustering of the one or more actions, a plurality of nodes for each application screen is created, by a node creation subsystem 370. Upon creation of the plurality of nodes, a requirement specification template is generated, by a template generation subsystem 380, by populating a predefined word processing which represents a complete view of actions required as a part of particular process.

Furthermore, the data capturing subsystem 310, the feature extraction subsystem 330, the level determination subsystem 340, the cluster creation subsystem 360, the node creation subsystem 370 and the template generation subsystem 380 are substantially similar to a data capturing subsystem 100, a feature extraction subsystem 110, a level determination subsystem 120, a cluster creation subsystem 130 a node creation subsystem 140 and a template generation subsystem 150 of FIG. 2.

Figure 5:
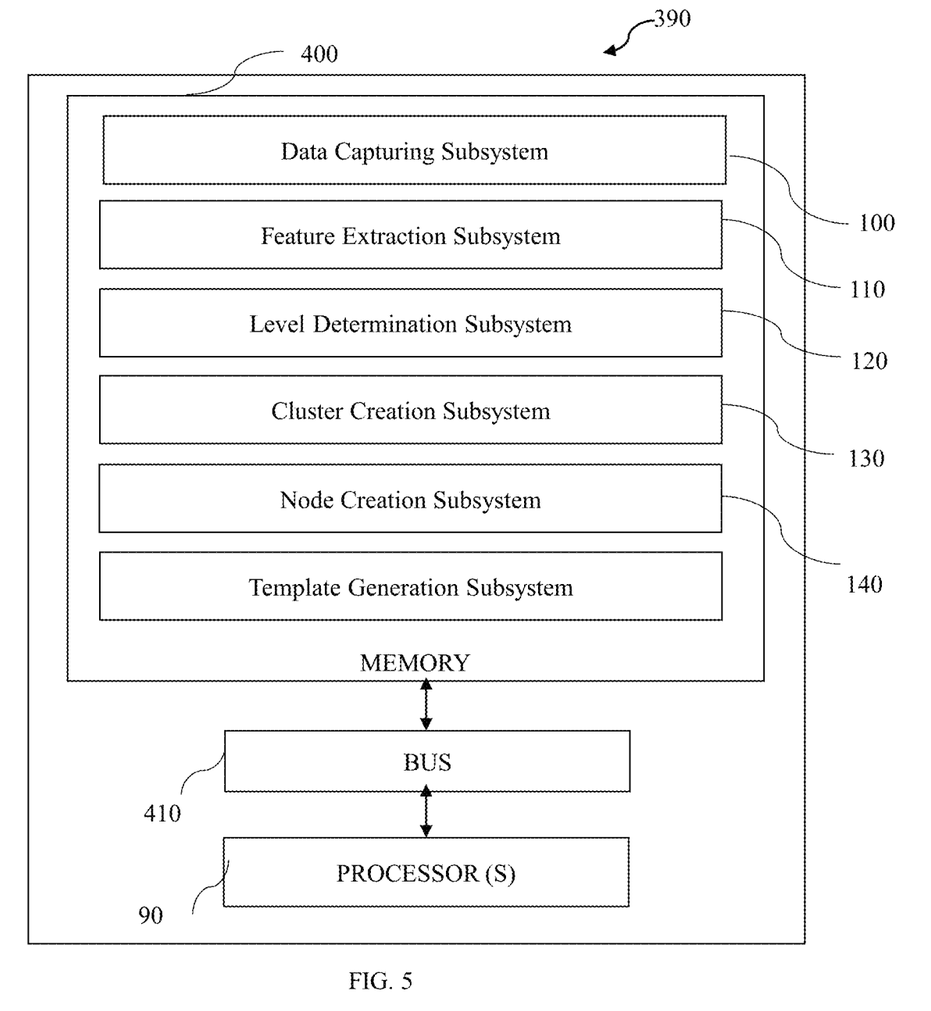
FIG. 5 is a block diagram of a general computer system in accordance with an embodiment of the present disclosure.

FIG. 5 is a block diagram of a general computer system 390 in accordance with an embodiment of the present disclosure. The computer system 390 includes processor(s) 90, and memory 400 coupled to the processor(s) 90 via a bus 410.

The processor(s) 90, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 400 includes a plurality of units stored in the form of executable program which instructs the processor 20 to perform the configuration of the system illustrated in FIG. 1. The memory 400 has following subsystems: a data capturing subsystem 100, a feature extraction subsystem 110, a level determination subsystem 120, a cluster creation subsystem 130 a node creation subsystem 140 and a template generation subsystem 150 of FIG. 2.

Computer memory elements may include any suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. The executable program stored on any of the above-mentioned storage media may be executable by the processor(s) 90.

The data capturing subsystem 100 instructs the processor(s) 90 to capture one or more application screens along with one or more actions performed by a user on the one or more corresponding application screens.

The feature extraction subsystem 110 instructs the processor(s) 90 to extract one or more features from one or more captured application screens by using an extraction technique.

The level determination subsystem 120 instructs the processor(s) 90 to determine a level of similarity between one or more extracted features of the corresponding one or more application screens and one or more prestored features of corresponding one or more prestored application screens.

The cluster creation subsystem 130 instructs the processor(s) 90 to create clusters of the one or more actions performed by the user based on a determined level of similarity for assigning the one or more actions to the corresponding one or more application screens.

The node creation subsystem 140 instructs the processor(s) 90 to create one or more nodes of the at least one application screens based on clustering of the one or more actions, wherein the one or more nodes are representative of one or more requirements to be gathered.

The template generation subsystem 150 instructs the processor(s) 90 to generate a specification template for process automation based on the one or more nodes of the at least one application screens, wherein the specification template comprises a process hierarchy.

Various embodiments of the present disclosure provide a technical solution to the problem of requirement gathering in process automation. The present disclosure provides an efficient system which monitors the user actions performed via the applications which in turn helps in gathering the data for process hierarchy in a very less time. Also, the system compares one or more extracted features using one or more advanced techniques, which in turn improves accuracy of obtained results.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A computer implemented method for requirement gathering in process automation, the computer implemented method comprising:
   capturing, by a data capturing subsystem, one or more application screens along with one or more actions performed by a user on the one or more corresponding application screens;
   extracting, by a feature extraction subsystem, color histograms from the one or more captured application screens by using an extraction technique;
   determining, by a level determination subsystem, a level of similarity between the color histograms of the corresponding one or more application screens and one or more prestored features of corresponding one or more prestored application screens based on a predefined threshold value of the color histograms, wherein the similarity is represented by a score generated by a histogram comparison technique;
   creating, by a cluster creation subsystem, clusters of the one or more actions performed by the user based on a determined level of similarity for assigning the one or more actions to the corresponding one or more application screens;
   creating, by a node creation subsystem, one or more nodes for each of the one or more application screens based on clustering of the one or more actions, wherein the one or more nodes are grouped for further creating one or more processes upon receiving instructions from a user, and wherein the one or more processes associated with each department are grouped to obtain an organization process hierarchy;
   generating, by a template generation subsystem, a requirement specification template for process automation based on the one or more nodes for each of the one or more application screens, by populating a predefined word processing indicating a complete view of actions required as part of particular process, wherein the requirement specification template comprises a process hierarchy; and wherein the one or more captured application screens are indicated as similar when the score of the color histograms exceeds the predefined threshold value, and wherein the one or more captured application screens are indicated as unique when the score of the color histograms is less than the predefined value.

2. The computer implemented method of claim 1, wherein capturing the one or more actions comprises capturing at least one of keyboard events, left clicks, right clicks, opening of windows, execution of system commands, clicks on checkboxes, text entered, and text edited.

3. The computer implemented method of claim 1, wherein capturing of the one or more application screens along with the one or more actions is performed by at least one entity.

4. A computer implemented system for requirement gathering in process automation, the computer implemented system comprising:

one or more processors;

a memory coupled to the one or more processors, wherein the memory comprises a set of program instructions in form of a plurality of subsystems, configured to be executed by the one or more processors, wherein the plurality of subsystems comprises:

a data capturing subsystem configured to capture one or more application screens along with one or more actions performed by a user on the one or more corresponding application screens;

a feature extraction subsystem configured to extract color histograms from the one or more captured application screens by using an extraction technique;

a level determination subsystem configured to determine a level of similarity between the color histograms of the corresponding one or more application screens and one or more prestored features of corresponding one or more prestored application screens based on a predefined threshold value of the color histograms, wherein the similarity is represented by a score generated by a histogram comparison technique;

a cluster creation subsystem configured to create clusters of the one or more actions performed by the user based on a determined level of similarity for assigning the one or more actions to the corresponding one or more application screens;

a node creation subsystem configured to create one or more nodes for each of the one or more application screens based on clustering of the one or more actions, wherein the one or more nodes are grouped for further creating one or more processes upon receiving instructions from a user, and wherein the one or more processes associated with each department are grouped to obtain an organization process hierarchy;

a template generation subsystem configured to generate a requirement specification template fora process automation based on the one or more nodes for each of the one or more application screens, by populating a predefined word processing indicating a complete view of actions required as part of particular process, wherein the requirement specification template comprises a process hierarchy; and wherein the one or more captured application screens are indicated as similar when the score of the color histograms exceeds the predefined threshold value, and wherein the one or more captured application screens are indicated as unique when the score of the color histograms is less than the predefined threshold value.

5. The computer implemented system of claim 4, wherein capturing the one or more user actions comprises capturing one of keyboard events, left clicks, right clicks, opening of windows, execution of system commands, clicks on checkboxes, text entered, and text edited.

6. The computer implemented system of claim 4, wherein capturing of the one or more application screens along with the one or more actions is performed by at least one entity.

* * * * *